United States Patent Office 2,753,349
Patented July 3, 1956

2,753,349

PRODUCTION OF VAT DYESTUFFS

Friedrich Ebel, Mannheim-Feudenheim, Germany, assignor to Badische Anilin- & Soda-Fabrik Aktiengesellschaft, Ludwigshafen am Rhein, Germany No Drawing. Application October 15, 1952,
Serial No. 314,945

Claims priority, application Germany October 23, 1951

11 Claims. (Cl. 260—262)

This invention relates to vat dyestuffs of the anthraquinone series.

We have found that valuable vat dyestuffs of the anthraquinone series are obtained by reacting 4-hydroxy-7,8-phthaloylcinnolines with cyclic aromatic primary amines in the presence of agents which are usually suitable for the conversion of carboxylic groups into carboxylic acid halide groups.

The reaction proceeds, for example, according to the following scheme:

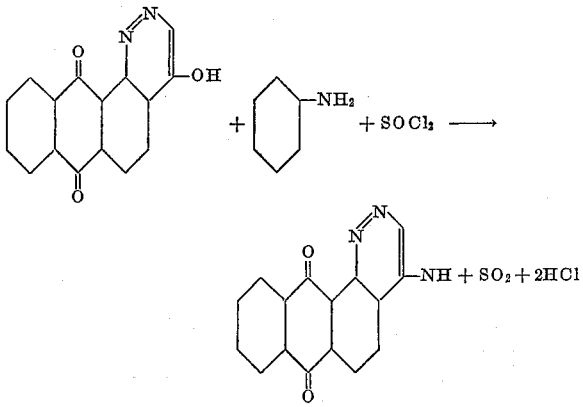

It is probable that there are first formed from the 4-hydroxy-7,8-phthaloylcinnolines, the 4-halogen-7,8-phthaloylcinnolines the reactive halogen atom of which then reacts with the amines. It is therefore also possible to proceed by first treating the 4-hydroxy-7,8-phthaloylcinnolines with one of the said agents and to react the 4-halogen-7,8-phthaloylcinnolines formed in situ with the amines. On the other hand, in many cases, the aromatic amine can be first reacted with the said agents, whereby intermediate products are formed (for example with phosphorus trichloride, the corresponding phosphazo-amide) which can be isolated and then reacted with the 4-hydroxy-7,8-phthaloylcinnolines. It is most advantageous, however, to allow the three reactants to act on each other simultaneously.

The said 4-hydroxy-7,8-phthaloylcinnolines, which may contain any other substituents, are obtained for example by treating 1-amino-2-acetylanthraquinones with nitrous acid, as described in my copending application, Serial No. 299,221, filed July 16, 1952. Suitable amines for the present process are for example anilines, toluidines, anisidines, aminodiphenyls, aminonaphthalenes, aminonaphthols, 1- or 2-aminoanthraquinones, halogen-aminoanthraquinones, nitro-aminoanthraquinones, aminoanthraquinone-aldehydes, amino-benzoylaminoanthraquinones, aminoanthanthrones, aminopyranthrones, aminodibenzanthrones, aminopyridines, Bz-aminoquinolines, aminoanthraquinone-benzacridones, phenylene-diamines, benzidines or diaminoanthraquinones.

Suitable agents which are capable of converting carboxylic acids into carboxylic acid halides are for example sulfur monochloride, thionyl chloride, chlorsulfonic acid, phosphorus trichloride, phosphorus pentachloride, phosphorus oxychloride, phosphorus tribromide, benzotrichloride or phthaloyl chloride.

The reaction is carried out in the presence or in the absence of an inert solvent or diluent at elevated temperature. The reaction products usually separate out from the reaction mixture as hydrohalic acid salts which may be used as dyestuffs as such or after previous hydrolysis by water. The dyestuffs, the shades of color of which are usually violet, brown or black, are characterized by very good fastness and in particular their levelling power is excellent.

The following examples will further illustrate this invention but the invention is not limited to these examples. The parts are by weight.

*Example 1*

5 parts of thionyl chloride are added while stirring to a suspension of 2 parts of 4-hydroxy-7,8-phthaloylcinnoline in 40 parts of nitrobenzene and the whole is stirred at 80° C. until all has passed into solution, for which purpose 1 to 2 hours are necessary. After distilling off the excess of thionyl chloride, 2 parts of aniline are introduced, the temperature is raised to 150° C. and the whole is stirred for about an hour at this temperature. It is then allowed to cool and the deposited red-brown crystalline precipitate, which is permeated by colorless crystals of aniline hydrochloride, is filtered off by suction and washed with benzene. For the purpose of purification it is dissolved in hot glacial acetic acid, filtered and the dyestuff reprecipitated from the filtrate with water. There are thus obtained 1.8 parts of 4-anilido-7,8-phthaloylcinnoline in the form of a violet powder which melts at 273° C. By recrystallisation from nitrobenzene, brown crystals are obtained which can be triturated to a violet powder. The compound dissolves in hot moderately concentrated sulfuric acid or hydrochloric acid with a yellow coloration and is reprecipitated therefrom in the form of violet crystals upon cooling. The new dyestuff dyes cotton violet shades from a red vat.

With meta-toluidine there is obtained in an analogous manner a dyestuff which after recrystallisation from nitrobenzene is obtained in the form of black-red, well-formed crystals having a melting point of 242° C. It dyes cotton violet shades from a red vat.

*Example 2*

A mixture of 27.6 parts of 4-hydroxy-7,8-phthaloylcinnoline, 600 parts of nitrobenzene and 50 parts of thionyl chloride is heated while excluding moisture and while stirring for 2 hours at 80° C. and for 1 hour at 120° C. The excess thionyl chloride is then distilled off in a current of nitrogen, 9.2 parts of benzidine are added to the remaining solution of 4-chlor-7,8-phthaloylcinnoline, the temperature is raised to 180° C. and the whole stirred for an hour at this temperature. After cooling, the deposited dyestuff is filtered off by suction, washed with methanol and dried. 26 parts of a violet powder are obtained which can be purified by dissolving it in concentrated sulfuric acid, diluting the solution with water to a content of 25% of sulfuric acid, filtering by suction the deposited violet precipitate, washing it with water, dilute caustic soda solution and again with water. The new dyestuff dyes cotton currant-colored shades from a red, diluted vat.

*Example 3*

A mixture of 11.04 parts of 4-hydroxy-7,8-phthaloylcinnoline, 8.92 parts of 1-aminoanthraquinone, 400 parts of nitrobenzene and 9.6 parts of thionyl chloride is heated while stirring first for 1 hour at 60° C., then for 1 hour at 100° C. and finally for 1 hour at 180° C. It is filtered by suction while hot and the residue washed with benzene. After drying there are obtained 17 parts of yellow-brown crystals, which dissolve in concentrated sulfuric acid with the evolution of hydrogen chloride and with a red coloration; upon addition of water, the dyestuff is precipitated in the form of red-brown flocks. With alcoholic potassium hydroxide there is obtained a grass-green salt which is hydrolysed with water to the original red-brown compound. The new dyestuff dyes cotton red-brown shades from a dark blue vat.

If 2-aminoanthraquinone be employed instead of 1-aminoanthraquinone, a hydrochloride of the new dyestuff is obtained which crystallizes in orange-brown leaflets. It dissolves in concentrated sulfuric acid with a red coloration and is reprecipitated as a dark red-brown precipitate upon dilution with water. The dyestuff dyes cotton red-brown shades from a violet vat with green-blue bloom.

With 1-chlor-5-aminoanthraquinone, a dyestuff is obtained in the form of brown crystals which dyes cotton violet-brown shades from a black-violet vat. Dyestuffs giving similar dyeings are obtained with 1-chlor-2-aminoanthraquinone or 2-chlor-5-aminoanthraquinone. A red vat dyestuff is obtained with 1-amino-2-bromanthraquinone.

Example 4

A mixture of 27.6 parts of 4-hydroxy-7,8-phthaloylcinnoline, 11.9 parts of 1,4-diaminoanthraquinone, 1000 parts of nitrobenzene and 24 parts of thionyl chloride is heated while stirring to 180 C. during the course of 2 hours. The mixture is further stirred for an hour at this temperature, then allowed to cool to 80° C., and the deposited precipitate is filtered off by suction, washed with benzene and dried. 37.5 parts of a black-brown powder are thus obtained which dissolves as the hydrochloride in concentrated sulfuric acid with evolution of hydrogen chloride and with a red-orange coloration. Upon the addition of water, the new dyestuff is precipitated in the form of Bordeaux colored flocks which dye cotton fast Bordeaux colored shades from a black-blue vat.

Similar dyestuffs are obtained with 1,5-diaminoanthraquinone or 2,6-diaminoanthraquinone. With 1-aminoanthraquinone-2-aldehyde there is obtained an olive-brown powder which dyes cotton brown shades from the vat.

Example 5

A mixture of 27.6 parts of 4-hydroxy-7,8-phthaloylcinnoline, 34.2 parts of 1-amino-4-benxoylaminoanthraquinone, 1000 parts of nitrobenzene and 24 parts of thionyl chloride is slowly heated to 180° C. while stirring and stirred at this temperature for an hour. The deposited dyestuff is filtered off by suction at 80° C., washed thoroughly with methanol and dried. 50.3 parts of violet-brown crystal powder are obtained which dissolves in concentrated sulfuric acid to give an olive coloration and dyes cotton powerful Bordeaux shades from a black-blue vat.

In an analogous manner there is obtained with 1-amino-5-benzoylaminoanthraquinone a dyestuff which dyes cotton vivid brown shades from a dark olive-brown vat. The dyestuff gives a brilliant orange colored sulfate which can be precipitated from the red-brown solution in concentrated sulfuric acid by the addition of a little water.

Example 6

A mixture of 27.6 parts of 4-hydroxy-7,8-phthaloylcinnoline, 47.1 parts of monoamino-dibenzanthrone, 1000 parts of nitrobenzene and 30 parts of thionyl chloride is slowly heated to 180° C. and stirred for an hour at this temperature. It is then allowed to cool to 80° C. and the deposited dyestuff is filtered off by suction, washed with benzene and dried. 69.1 parts of a black powder are obtained which dissolves in concentrated sulfuric acid giving a violet coloration and dyes cotton powerful olive shades from a blue vat.

Example 7

A mixture of 27.6 parts of 4-hydroxy-7,8-phthaloylcinnoline, 24.7 parts of 2-amino-1,9-anthrapyrimidine, 1000 parts of ortho-dichlorbenzene and 24 parts of thionyl chloride is slowly heated to 180° C. while stirring and then stirred for an hour at this temperature. After the usual working up, 49.7 parts of a black crystal powder are obtained which dyes cotton powerful blue-grey shades from a black-violet vat.

In an analogous manner a red-brown dyestuff is obtained with 4-amino-1,9-anthrapyrimidine, and a dark brown dyestuff with 5-amino-1,9-anthrapyrimidine.

Example 8

A mixture of 27.6 parts of 4-hydroxy-7,8-phthaloylcinnoline, 40.9 parts of 4-aminoanthraquinone-3',5'-dichlor-1,2,2',1',-benzeneacridone, 1200 parts of nitrobenzene and 24 parts of thionyl chloride is slowly heated to 180° C. while stirring and then further stirred for an hour at this temperature. After the usual working up, 26.5 parts of a dark blue crystalline powder are obtained which dissolves in concentrated sulfuric acid with a dark orange coloration and dyes cotton powerful violet shades from a black-blue vat.

Example 9

A mixture of 39.5 parts of 4-hydroxy-7,8-(3'-benzoylaminophthaloyl)-cinnoline of the formula:

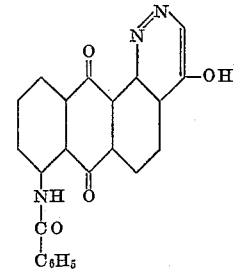

23 parts of 1-aminoanthraquinone, 1000 parts of nitrobenzene and 24 parts of thionyl chloride is slowly heated to 180° C. while stirring. It is then stirred for about a further hour at this temperature and the dyestuff formed is filtered off by suction at 80° C., washed with benzene and dried. 50 parts of a brown crystal powder are obtained which dissolves in concentrated sulfuric acid with a dark red-brown coloration and dyes cotton red-brown shades from a violet vat.

What I claim is:
1. The vat dyestuff

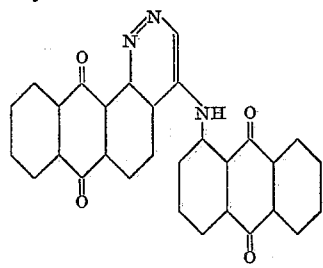

2. The vat dyestuff

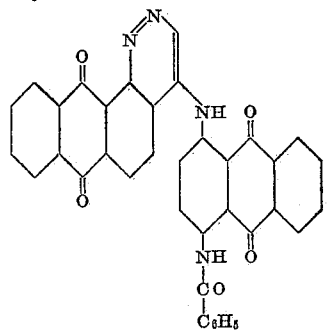

3. The vat dyestuff

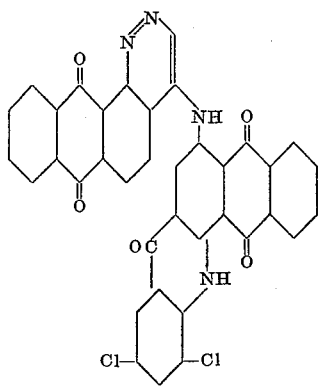

4. The vat dyestuff

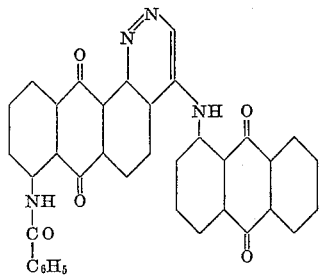

5. A process for the production of a vat dyestuff which comprises heating a mixture of a 4-hydroxy-7,8-phthaloyl-cinnoline, 1-aminoanthraquinone, and thionyl chloride at a temperature of about 60° C. to 180° C.

6. A process for the production of a vat dyestuff which comprises heating a mixture of 4-hydroxy-7,8-(3'-benzoyl-aminophthaloyl)-cinnoline, 1-aminoanthraquinone, thionyl chloride, and nitrobenzene to about 180° C.

7. A vat dyestuff of the general formula

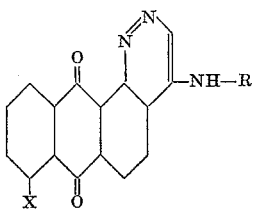

wherein X represents a radical selected from the group consisting of hydrogen and benzoylamino and —NH—R represents a radical of a compound selected from the group consisting of 1-aminoanthraquinone, 2-aminoanthraquinone, 1-amino-5-chloroanthraquinone, 4-benzoyl-amino-1-aminoanthraquinone, 5-benzoylamino-1-aminoanthraquinone, 4-aminoanthraquinone-3',5'-dichlor-1,2,-2',1'-benzacridone, 2-amino-1,9-anthrapyrimidine and 1,4-diaminoanthraquinone.

8. The vat dyestuff

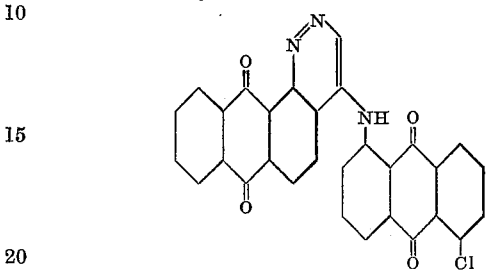

9. A process for the production of a vat dyestuff which comprises condensing a compound selected from the group consisting of 4-hydroxy-7,8-phthaloylcinnoline and 4-hydroxy-7,8-(3'-benzoylaminophthaloyl)-cinnoline with a compound selected from the group consisting of 1-aminoanthraquinone, 2-aminoanthraquinone, 1-amino-5-chloroanthraquinone, 4-benzoylamino-1-aminoanthraquinone, 5-benzoylamino-1-aminoanthraquinone, 4-aminoanthraquinone-3',5'-dichlor-1,2,2',1'-benzacridone, 2-amino-1,9-anthrapyrimidine and 1,4-diaminoanthraquinone, employing thionyl chloride to effect the condensation.

10. A process for the production of a vat dyestuff which comprises heating a mixture of a compound selected from the group consisting of 4-hydroxy-7,8-phthaloylcinnoline and 4-hydroxy-7,8-(3'-benzoylaminophthaloyl)-cinnoline, a compound selected from the group consisting of 1-aminoanthraquinone, 2-aminoanthraquinone, 1-amino-5-chloroanthraquinone, 4-benzoylamino-1-aminoanthraquinone, 4-aminoanthraquinone-3',5'-dichlor-1,2,2',1'-benzacridone, 2-amino-1,9-anthrapyrimidine and 1,4-diaminoanthraquinone, and thionyl chloride in the presence of nitrobenzene at a temperature of about 60° C. to 180° C.

11. A process for the production of a vat dyestuff which comprises heating a mixture of 4-hydroxy-7,8-phthaloyl-cinnoline, 2-aminoanthraquinone, and thionyl chloride at a temperature of about 60° C. to 180° C.

No references cited.